United States Patent [19]
Stout et al.

[11] 3,711,687
[45] Jan. 16, 1973

[54] COMPUTER CONTROL OF PARALLEL PAPER MILL REFINERS FOR CONTROLLING THE FREENESS OF STOCK BY CONTROLLING THE STOCK TEMPERATURE RISE THROUGH EACH REFINER

[75] Inventors: Thomas M. Stout, Northridge, Calif.; Edward J. Smith, Houston, Tex.; John H. Hiestand, Canoga Park, Calif.

[73] Assignee: The Bunker-Ramo Corporation, Canoga Park, Calif.

[22] Filed: June 27, 1968

[21] Appl. No.: 740,730

[52] U.S. Cl. ............235/151.1, 162/258, 444/1
[51] Int. Cl. .............................................D21f 1/08
[58] Field of Search........235/151.1, 151.13, 151.35, 235/150, 150.1, 151; 162/252, 254, 258, 262, 253, 263; 73/73; 241/28, 33

[56] References Cited

UNITED STATES PATENTS

| | | | |
|---|---|---|---|
| 3,276,353 | 10/1966 | Burner et al. | 241/33 X |
| 1,936,225 | 11/1933 | Broughton | 162/258 X |
| 2,379,835 | 7/1945 | Sisler | 162/263 X |
| 3,186,215 | 6/1965 | Danforth | 162/258 X |
| 3,313,681 | 4/1967 | Dennis et al. | 162/259 X |
| 3,461,030 | 8/1969 | Keyes | 162/252 X |
| 3,490,689 | 1/1970 | Hart et al. | 162/252 X |

*Primary Examiner*—Joseph F. Ruggiero
*Attorney*—Frederick M. Arbuckle

[57] ABSTRACT

Apparatus is disclosed for controlling freeness of stock from parallel refiners by controlling the rise in temperature of stock through each refiner. The $\Delta T$ setpoint for each refiner is adjusted to compensate for: variations in consistency of stock; maximum power rating of the refiner; weighted average freeness of stock from all refiners; and the composite frheness of stock delivered to a paper machine. Error in the desired temperature rise of a given refiner is employed to control its disc or plug operation. An on-line analyzer is employed to monitor composite freeness. Couch or flatbox vacuum is employed as an alternative measure of composite freeness, but only if intentional paper machine changes which would affect vacuum have not been made. Operator control of composite freeness is also permitted. The composite freeness setpoint is adjusted to maintain a desired paper bursting strength. Power checks are made and instructions are automatically given to adjust flow rate to an individual refiner in order to keep it operating within its maximum power limit and to add or delete refiners for optimum efficiency.

51 Claims, 8 Drawing Figures

Fig. 4    DC-1 CONTROL PART II

# 3,711,687

COMPUTER CONTROL OF PARALLEL PAPER MILL REFINERS FOR CONTROLLING THE FREENESS OF STOCK BY CONTROLLING THE STOCK TEMPERATURE RISE THROUGH EACH REFINER

BACKGROUND OF THE INVENTION

1. Field of the Invention

This invention relates to computer controlled industrial processes and more particularly to a system for using a computer to control parallel refiners in a paper mill.

2. Description of the Prior Art

The control of refined stock freeness is one of the most important and complex operations in the manufacture of paper. Freeness is a characteristic of stock which may be measured on line with an analyzer, such as a Bailey freeness analyzer, or in a laboratory with samples. Briefly, the term "freeness" denotes the ease with which water drains away from a web or mat of refined fiber through a wire mesh or perforated plate. A free stock is indicated when water leaves the mat freely. In general, freeness of stock is inversely proportionate to its refinement.

Many refiners have been developed which fall into two general classes: disc refiners and conical refiners known as Jordan machines. The latter consists of a conical rotor or plug which rotates inside a conical shell. Longitudinal bars on the surface of the rotor are opposed by bars on the stationary shell. As stock is pumped through the shell, the bars of the rotor cut the stock fibers. To decrease the fiber length of emerging stock, a hydraulic motor (usually controlled through an electrically operated valve) forces the rotor further into the shell, thereby decreasing the space between the rotating and stationary bars. That increases the power required to drive the rotor, and most of the power increase appears as sensible heat in the stock due to greater work done on it. Accordingly, the rise in temperature of stock put through a refiner is proportional to the degree of refining.

A disc refiner operates in a manner similar to a Jordan machine. The stock enters through the center of a stationary disc and passes outward between the stationary disc and a rotating disc. Grooves on opposing faces of the discs cut the stock fibers. The degree of refining is controlled by hydraulically adjusting the distance or gap between the discs. As in the Jordan machine, the rise in temperature of stock put through it is proportional to the degree of refining.

It has been the practice in paper machine installations to control the degree of refining by controlling the rise in temperature of stock being put through the refiners. Accordingly, it is possible to regulate freeness of stock delivered to a paper machine by regulating the rise in temperature of stock through individual refiners. However, such freeness control is satisfactory only while the flow rate and consistency of stock remain constant. The temperature of water added to the stock must also remain constant, but, except for seasonable changes, it can be expected to remain sufficiently constant to permit freeness control by regulating the temperature rise of stock through individual refiners. Flow rate can also be expected to remain sufficiently constant; if a change is made in the flow rate, a compensating change may be made in the temperature-rise setpoint. Consistency, on the other hand, is not constant. Consistency regulators are generally employed in paper mills, but it has been found that they do not maintain consistency sufficiently constant to permit acceptable regulation of freeness through control of stock temperature rise alone.

Since the freeness of stock to the headbox in a paper machine is the composite freeness of stock from parallel refiners, it is desirable to regulate the composite freeness as well as the freeness of stock from each refiner. As noted hereinbefore, analyzers are available for measuring freeness on-line, but, since freeness is a measure of the ease with which water drains from a mat of stock fiber, and water is purposely caused to be drained from a continuous mat as it is put through a Fourdrinier paper machine by a vacuum box (generally applied at a couch or flatbox, or both), it has sometimes been the practice to use such vacuum as a measure of composite freeness and to use such measurement to regulate freeness. However, various adjustments made on a Fourdrinier paper machine may affect couch vacuum so that it cannot be relied upon to control freeness except in the absence of such changes. The changes which generally affect couch vacuum are; speed of the Fourdrinier wire screen, headbox flow, basis weight and preheater steam flow. A significant change in any of these will cause a change in couch vacuum even though freeness has remained constant.

For best results, freeness of the stock going to the paper machine should be maintained constant by so controlling parallel refiners that the composite freeness of the stock to the headbox of the Fourdrinier machine is at a constant setpoint while the stock leaving each refiner is the same.

Bursting strength (Mullen) is one of the most frequently measured characteristics of paper, since all paper and much of the paper board is sold on a specified Mullen. It is tested by measuring the force needed to rupture a sample. The force is exerted by hydraulic pressure on a rubber diaphragm placed against a taut sample. It is common practice to average ten tests on a side across a sample taken from the paper as it is wound on a reel. Since bursting strength is affected by freeness and basis weight, it is desirable to adjust the freeness setpoint in accordance with the results of Mullen and basis weight tests, and to have all of the refiners adjusted accordingly.

In the past, control of refiners has been based on either the temperature rise of stock through the refiners, or vacuum, with an attempt to manually maintain the freeness of the stock leaving each refiner the same based upon laboratory tests made every hour or two. Since each refiner has its own characteristics, it is desirable to check any control to be exercised over each to determine whether any adjustment required will exceed its maximum power limitation. If so, the plug or disc position should be adjusted only to the point of loading the refiner to its maximum limitation. As a consequence, the freeness of stock from that refiner will not be decreased sufficiently and other refiners may require adjustment to maintain the composite freeness at the desired value. That is an undesirable solution, for then the freeness of the stock leaving each refiner will no longer be the same. Moreover, under some circumstances more than one refiner may reach its maximum load limit. Therefore, it would be preferable to decrease the flow of stock to the refiner so that it can be adjusted to deliver stock of the same freeness as other refiners in parallel. In some cases, it may be desirable to add or delete refiners to optimize the power usage of the refiners while maintaining the desired stock flow to the machine with a desired composite freeness.

OBJECTS AND SUMMARY OF THE INVENTION

An object of this invention is to provide a system whereby freeness of stock to a paper machine is controlled.

Another object of this invention is to provide a control system for a group of parallel refiners to furnish fiber stock to a paper machine of constant freeness.

Still another object of this invention is to provide a control system for a group of parallel refiners to furnish fiber stock to a paper machine with optimum power usage.

Yet another object of this invention is to provide a control system for parallel refiners to maintain the freeness of the stock leaving each refiner the same as that of all others while the composite freeness of the stock from all refiners is controlled.

Another object of this invention is to provide a control system to maintain freeness of stock to a paper machine equal to a desired value while adjusting that value to meet a desired value of bursting strength.

These and other objects are achieved in an arrangement wherein signals developed by sensors or transducers are applied to a computer adapted to receive such signals as data concerning the process being controlled and having provided therein four computing sections, preferably in the form of stored programs, for performing certain mathematical computations on the data to provide a disc or plug control signal to each of a plurality of refiners delivering stock to a paper machine. Factors in control equations are periodically updated from input data, and the equations are employed to so control the operation of each refiner that the composite freeness of the stock going to the paper machine is constant and the freeness of the stock leaving each refiner is the same as that of all others.

Each individual refiner is controlled by a first computing section which seeks to maintain temperature rise of stock put therethrough at a predetermined setpoint which is varied by second and third computing sections, as well as changes in consistency of stock into the refiner. Before the first section delivers a control output to a refiner, the new power requirements of the refiner are predicted from the change to be produced by the control output and the present power requirements. If the predicted power exceeds the maximum limit for the refiner, a new control output is computed which loads the refiner to just its maximum power, and a signal is provided for the operator instructing him to reduce stock flow to the refiner in order to reduce its power consumption.

The second section is used to insure that the freeness of the individual refiners is equal to a weighted average of the freeness of all refiners. Deviation in the freeness of a given refiner is employed to generate a new temperature-rise setpoint to correct its freeness to the weighted average freeness. In that manner, parallel refiners are so controlled that the freeness of stock leaving each is substantially the same as that of all others.

The third section compares the composite freeness of stock from the parallel refiners with a desired freeness, and the difference is employed to generate a change in the temperature-rise setpoint of each of the refiners in parallel. An on-line freeness analyzer is provided, but in the event that it not be on-line at the time the third section seeks to compare the composite stock freeness with a desired freeness value, the third section provides as an alternate composite-freeness measurement a vacuum measurement which is compared with a desired vacuum corresponding to the desired composite freeness. However, before using vacuum as a freeness measurement, a check is made to determine whether any intentional machine changes have been made which would affect vacuum. If there were none, vacuum is allowed to control composite freeness when the freeness analyzer is not on-line. If the freeness analyzer is on-line, its output is employed to control freeness, and the then existing vacuum is stored in the computer in order that the next time the third section seeks to control composite freeness, an updated vacuum value is available should the freeness analyzer not be on-line.

In the event the freeness analyzer is not on-line and an intentional machine change has been made which would affect vacuum, the third section will not compute a control output to the parallel refiners. Instead, the third section looks to see whether or not a change in composite freeness has been manually entered into the computer. If not, and vacuum may not be used as an alternative measurement of composite freeness while the freeness analyzer is not on-line, a signal is simply delivered to the operator advising that composite freeness is not on computer control. If so, the change in freeness manually entered is effected.

The fourth computing section calculates changes to be made in the composite freeness to correct for deviation in the Mullen of paper being produced out of the stock from the parallel refiners. Since Mullen is affected by basis weight, deviation from basis weight from a desired value is included in the Mullen control of composite freeness.

The novel features considered characteristic of this invention are set forth with particularity in the appended claims. The invention itself will be best understood as to its organization and method of operation from the following description when read in connection with the accompanying drawings.

DESCRIPTION OF THE PREFERRED EMBODIMENTS

Figure 1:
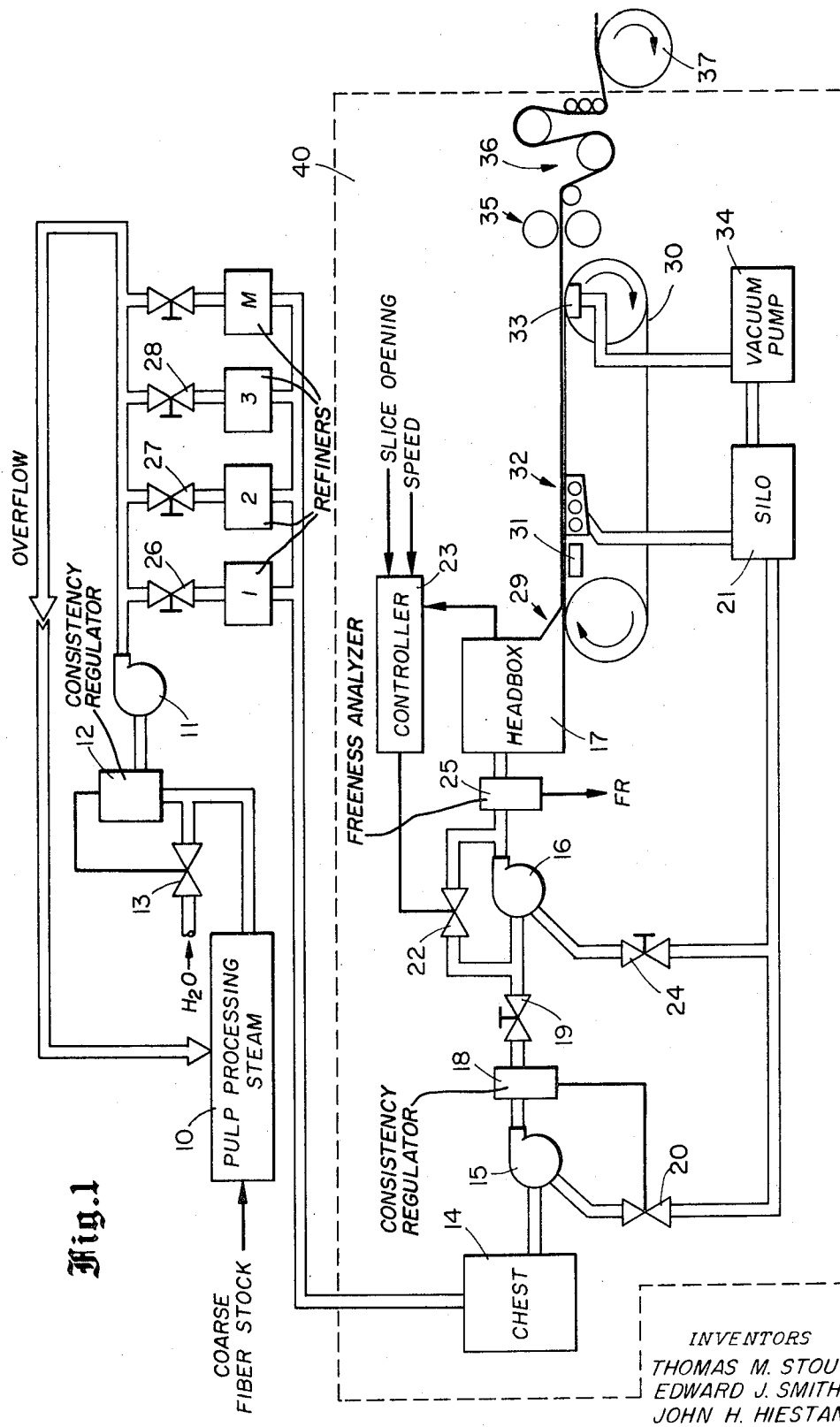
FIG. 1 is a schematic diagram of a typical paper mill to be controlled in accordance with the present invention.

FIG. 1 illustrates in simplified form a typical mill for manufacturing paper. Coarse fiber stock is introduced into a processing stream 10, where it is reduced to pulp with enough water added to fit it for further processing. The stock is then pumped into parallel refiners 1, 2, 3 . . . n, where the fibers are refined. One pump 11 usually serves all refiners, and any overflow is returned to the processing stream 10.

A consistency regulator 12 is placed between the processing stream 10 and the pump 11 to maintain constant the percentage by weight of pulp and water. It consists of paddles mounted on a shaft for rotation within an enclosed chamber. As the consistency of the stock varies, torque on the shaft varies proportionately. A sensitive pneumatic force-balance transducer develops a signal proportional to the torque. A valve 13 is operated by that signal to so vary the flow of water into the pulp stream as to try to maintain consistency constant. If the consistency of stock from the regulator 12 nevertheless varies, compensating adjustments to the refiners may be necessary.

The refiner stock (fiber in suspension of a consistency in the range of about 3.5 to 4 percent) is delivered to a machine chest 14 where it is stored. Pumps 15 and 16 transfer refined stock to a headbox 17 as it is needed to make paper in a machine. Although illustrated as a Fourdrinier machine, it may be a Cylinder machine. A consistency regulator 18 is provided to maintain the consistency of stock through a control valve 19 at about 3.0 to 3.5 percent. A control valve 20 for that regulation is connected to a silo 21 which collects drainage. In that manner, dilution of stock from the machine chest is accomplished with recycled water.

A valve 22 is placed around the pump 16 to maintain the stock in the headbox 17 at a desired level for a given set of conditions which include machine speed and slice opening. A controller 23 may be provided for that purpose. The stock into the headbox 17 is at the same time further diluted to a consistency of about 0.5 percent by water from the silo 21 introduced in the pump 16 via a control valve 24.

It is desirable to have a constant stock freeness (ease with which water drains from a fiber mat). To accomplish that, the individual refiners are adjusted to a weighted average of laboratory freeness tests ($LF_1$, $LF_2$ . . . $LF_m$) and then controlled to maintain a constant composite freeness in accordance with the present invention, as will be described more fully with reference to FIG. 2. The composite freeness (FR) is measured on-line by, for example, a Bailey freeness analyzer 25. Once a given refiner has been set for a particular freeness of its stock output, it is controlled to maintain that freeness by monitoring the temperature rise of stock through it, monitoring the consistency of the stock into it, and maintaining the ratio of temperature rise to consistency substantially constant in accordance with another aspect of the present invention, also to be more fully described with reference to FIG. 2. However, in accordance with a further aspect of the present invention, before any adjustment is made to a refiner, a predicted power consumption for the refiner is computed based on present power consumption and the charge in the temperature rise to be made.

If the predicted power exceeds the maximum power rating of the refiner, the refiner is adjusted to just its maximum and a signal is given to the operator to reduce flow to the refiner. Valves are provided for that purpose, such as valves 26, 27, and 28 for refiners 1, 2, and 3. The predicted power consumption of all refiners in parallel is checked against their combined maximum power limits to determine when a refiner should be deleted, or added, in order to optimize the efficiency of the refiners.

Stock flowing out of a slice 29 in the headbox 17 passes onto a continuous moving wire screen 30. After the fiber mat formed on the moving screen 30 moves away from the slice 29 and over a forming board 31, it passes over foils or rolls 32, where drainage is collected and deposited in the silo 21. The mat then passes over flatboxes (not shown) and a couch 33, where water is drawn from it by a wet vacuum pump 34. Drainage from the pump 34 is returned to the system. For simplicity, it is shown as being returned directly to the silo 21, although that is not always, or necessarily ever, the case. Since the vacuum is a function of freeness, it may be used us an alternative to the on-line freeness analyzer 25, as when it is down for maintenance or repair. But before that may be safely done, the validity of the vacuum measurement must be determined in accordance with a further aspect of the present invention.

The mat is removed as paper from the screen following the end of the couch 33, passed through press rollers 35, a steam heated drying section 36, and onto a reel 37. Periodically, the bursting strength of the paper is measured by a Mullen tester (not shown) which measures the pressure needed to rupture a sample. That is preferably done twenty times across the reel, alternating ten on each side. The average is computed and compared against a standard or target value. The difference is then taken into account in adjusting the temperature rise of the refiners (i.e., in adjusting the composite freeness of stock into the headbox 17), in accordance with still a further aspect of the present invention. Since other paper characteristics affect the Mullen value, they may be taken into consideration in adjusting composite freeness. Basis weight is such a characteristic used after discounting all moisture (i.e., after calculating dry basis weight).

Figure 2:
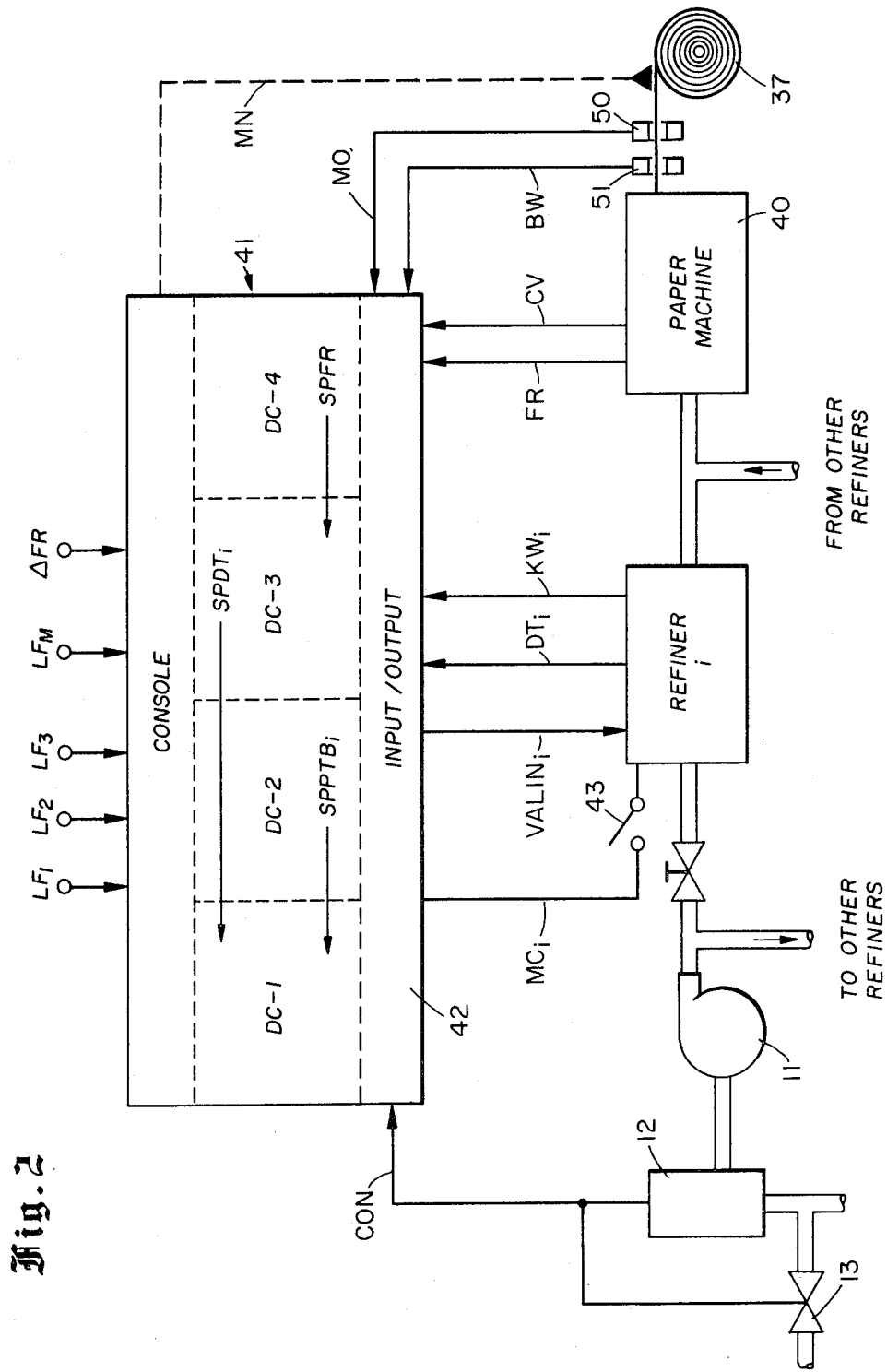
FIG. 2 is a block diagram of a stored-program, digital computer installation in a paper mill in accordance with a preferred embodiment of this invention.

The manner in which the various aspects of the present invention are provided in a computer controlled system will now be described with reference to FIG. 2. For simplicity, only a given one of the refiners $i$ is shown, but is should be understood that a plurality of refiners are connected in parallel between pump 11 and the paper machine shown as a block 40 in place of that portion of FIG. 1 enclosed by a dotted line and identified by the same reference numeral. Each of the other refiners 1, 2, 3 . . . n not shown in FIG. 2 is controlled by a digital computer 41 in the same manner as refiner $i$, as will be presently described.

The computer 41 has been divided into four sections: DC-1, DC-2, DC-3, and DC-4. Each will be described in turn as a separate computing section. It should be understood that in the preferred embodiment each is a separate program stored in the memory of the single digital computer 41 and selectively called into operation, periodically in the case of sections DC-1 and DC-3, and on operator demand in the case of sections DC-2 and DC-4. However, separate special purpose computing sections could be provided if that is, or becomes, economically feasible. Indeed, some or all of the functions of the computer 41 may be provided by analog computational means, although digital computational means are preferred because of inherently greater accuracy at less cost and great flexibility when making changes to the system of FIG. 1. Therefore, such means comprising the present invention must be construed to embrace both digital and analog means.

Before proceeding with a detailed description of the various sections of the computer 41, it should be noted that an embodiment of the present invention was reduced to practice with a commercial computer Model B-R 340, which has a core memory used for all operations, including input and output operations, and an auxiliary magnetic drum memory for storing programs, constants to be used in the programs, and data to be carried forward from one execution of a given program to the next or to the execution of another program. However, other commercial computers adapted for analog input and output operations may be employed.

DC-1 SECTION

The first section DC-1 of the computer 41 controls individual refiners to maintain the temperature rise DT of the stock put through it constant, taking into consideration significant changes in the consistency of stock delivered into it. It can be shown by an energy balance analysis that the ratio of the temperature rise to consistency is proportional to the work performed per unit fiber. In addition, a relationship can be established between the ratio of work to unit fiber and freeness. Therefore, the freeness of an individual refiner is controlled by monitoring the rise in temperature DT (i.e., monitoring the difference between the temperature of the stock in and of the stock out) via an input/output section 42 and correcting the disc (or plug in the case of a Jordan machine) position in response to a control signal VALIN to maintain a constant rise in temperature, again via input/output section 42. Implementation of the input/output section with standard commercial components is well known to those skilled in the art and therefore will not be described here. The means for making specified measurements in the system to be controlled and transmitting appropriate signals to the input/output section are also too well known to require their description here.

If the consistency of the stock into the refiners is varying outside a reasonable range, a consistency correction is applied to the temperature-rise setpoint. In that manner, the ratio of temperature rise (DT) to consistency (CON) is maintained constant within a reasonable range. This is to compensate for long term upsets entering the refiners from the pulp processing stream.

The control equations for the section DC-1 are as follows:

$$[SPDT_i = (SPDT_1 + SPDTB_i) \ CON_1/CON_2 \quad 1$$

$$ERDT_i = [SPDT_i] - DT_i \quad 2.$$

$$VALIN_i = A_i \cdot ERDT_i + B_i \cdot ERDTO_i \quad 3.$$

where the subscript i refers to a given one of refiners 1 to n. The terms employed in those equations are defined as follows:

$DT_i$  present DT(°F) signal developed by sensors connected to the refiner i.

$SPDT_i$  present DT setpoint (°F) signal stored in the computer 41 for refiner i.

$SPDTB_i$  DT setpoint bias signal from section DC-2 (°F).

$CON_1$  previous consistency signal (percent weight of fiber in water) developed by regulator 12 and stored in computer 41 from the last iteration of the program for section DC-1.

$CON_2$  present consistency signal (percent weight of fiber in water) developed by regulator 12.

$[SPDT_i$  new DT setpoint (°F) signal developed by current iteration of the program for section DC-1.

$ERDT_i$  present DT error (°F) signal developed by current iteration of the program for section DC-1.

$ERDTO_i$  previous DT error (°F) signal developed by the previous iteration of the program for section DC-1.

$A_i$  one of two constants for a two-mode digital control algorithm (sec./°F) stored in the computer 41.

$B_i$  other of two constants for a two-mode digital control algorithm (sec./°F) which is negative and which is also stored in the computer 41.

$VALIN_i$  control signal output to refiner i.

The constants $A_i$ and $B_i$ are first determined from a mathematical model of the control system for refiner i and then adjusted (tuned) for the particular characteristics of the refiner i in a manner well known to those skilled in the art of digital control of industrial processes. Briefly, it can be shown that for a three-mode analog algorithm of the form $$P = K_P \epsilon + K_I \int_{-\infty}^{t} \epsilon dt + K_D \frac{D\epsilon}{dt} \quad (4)$$

where $K_P$, $K_I$ and $K_D$ are respective constants of proportional control, integral control and derivative control, and that a corresponding three-mode digital algorithm may be derived in the form $$\Delta P = A \ \epsilon_i + B \ \epsilon_{i-1} + C \ \epsilon_{i-2} \quad 5$$

where the terms of both equations are defined as follows:

$P$  continuously manipulated variable.

$\Delta P$  increment of manipulated variable.

$\epsilon$  continuously varying error.

$\epsilon_i$  present error.

$\epsilon_{i-1}$  previous error.

$\epsilon_{i-2}$  error previous to $\epsilon_{i-1}$.

The three constants $A$, $B$, and $C$ taken as a group, not individually, correspond to the three constants $K_P$, $K_I$ and $K_D$ as follows:

$$A = K_P + K_I \Delta t + K_D/\Delta t \qquad 6.$$

$$B = -(K_P + 2 K_D/\Delta t) \qquad 7.$$

$$C = K_D/\Delta t \qquad 8.$$

The analog algorithm constants are quite difficult to adjust in an analog controller, but not in a digital controller since each may be set equal to any precise value in a digital computer. For a two-mode control algorithm using only proportional and integral terms, the digital algorithm is of the form $$\Delta P = A \epsilon_i + B \epsilon_{i-1} \qquad 9.$$

where:

$$A = K_P + K_I \Delta t \qquad 10$$

$$B = -K_P \qquad 11.$$

In the foregoing equation (3) for the incrementally manipulated variable $VALIN_i$ of a given refiner ($i$), the constants tuned for that refiner are identified as $A_i$ and $B_i$, while the error $\epsilon_i$ is, of course, $ERDT_i$ and the error $\epsilon_{i-1}$ is $ERDTO_i$ Before the DC-1 section of the computer transmits the signal $VALIN_i$ to the given refiner ($i$) to change its disc or plug position, the predicted power of that refiner is computed from the change to be made and the present power consumption of the refiner in accordance with the following equation:

$$PRKW_i = KW_i (1 + C_i VALIN_i/DT_i) \qquad 12.$$

where:

$PRKW_i$ = predicted power in kilowatts.

$KW_i$ = present power signal in kilowatts developed by a sensor connected to refiner $i$.

$C_i$ = a factor stored in the computer 41 for converting $VALIN_i$ back into °F of change in the temperature-rise setpoint SPDT.

If the predicted power exceeds the maximum limit for the particular refiner, a signal is given for the operator instructing him to reduce the flow to that refiner in order to reduce its power consumption. That signal may be a message delivered through a typewriter. At the same time, a visual or audible alarm may be given calling the operator's attention to the message. A substitute control signal is then computed which will load the particular refiner only to its maximum power in accordance with the following equation:

$$[VALIN_i = DT_i/C_i[(KWMAX_i/KW_i) - 1] \qquad 13.$$

where:

$KWMAX_i$ is the maximum power rating of the refiner stored in the digital computer 41.

To start the control process, an initial signal $SPDT_i$ is manually or otherwise entered into the computer setting the starting setpoint for the temperature rise to the then existing, actual process signal $DT_i$. The system is then switched to computer control. Thereafter, as new temperature-rise setpoints ($SPDT_i$) are computed and compared in value with current temperature-rise signals $DT_i$, to compute the current difference or error signal $ERDT_i$, the two-term direct digital control algorithm with separate constants $A_i$ and $B_i$ for the particular refiner is employed to compute the control signal $VALIN_i$, which positions the disc or plug of the refiner.

In a system actually reduced to practice, the refiner disc was hydraulically positioned. Accordingly, the signal $VALIN_i$ was multiplied by a control coefficient which converted it into time (seconds) for positioning a hydraulic valve with a motor of constant speed. The DC-1 section of the computer then simply applies a control signal to the motor through an input/output section 42 for the specified time. However, for simplicity, the signal $VALIN_i$ is shown in FIG. 2 as being applied directly to the refiner 11, instead of to a hydraulic control valve.

Each refiner has a manual control switch, such as switch 43 for refiner i, which allows the operator to locally override the computer control. In the manual position, the switch presents a closed contact to the computer so that, when the computer addresses the refiner, a manual control signal $MC_i$ effectively disables the computer output signal $VALIN_i$, thereby allowing local manual positioning of the hydraulic control valve. Each time the control program runs with the switch in the manual position (i.e., with an $MC_i$ signal present), the temperature-rise setpoint signal $SPDT_i$ is set to the current temperature-rise signal $DT_i$. In the computer control position of that switch, the contact is opened (i.e., signal $MC_i$ is not present), and the computer output is allowed to control the refiner.

The input stock consistency signal CON is monitored, and when a significant change is recognized, the temperature-rise setpoint signal for the refiner i is adjusted to compensate for that change in accordance with equation (1).

Figure 3:
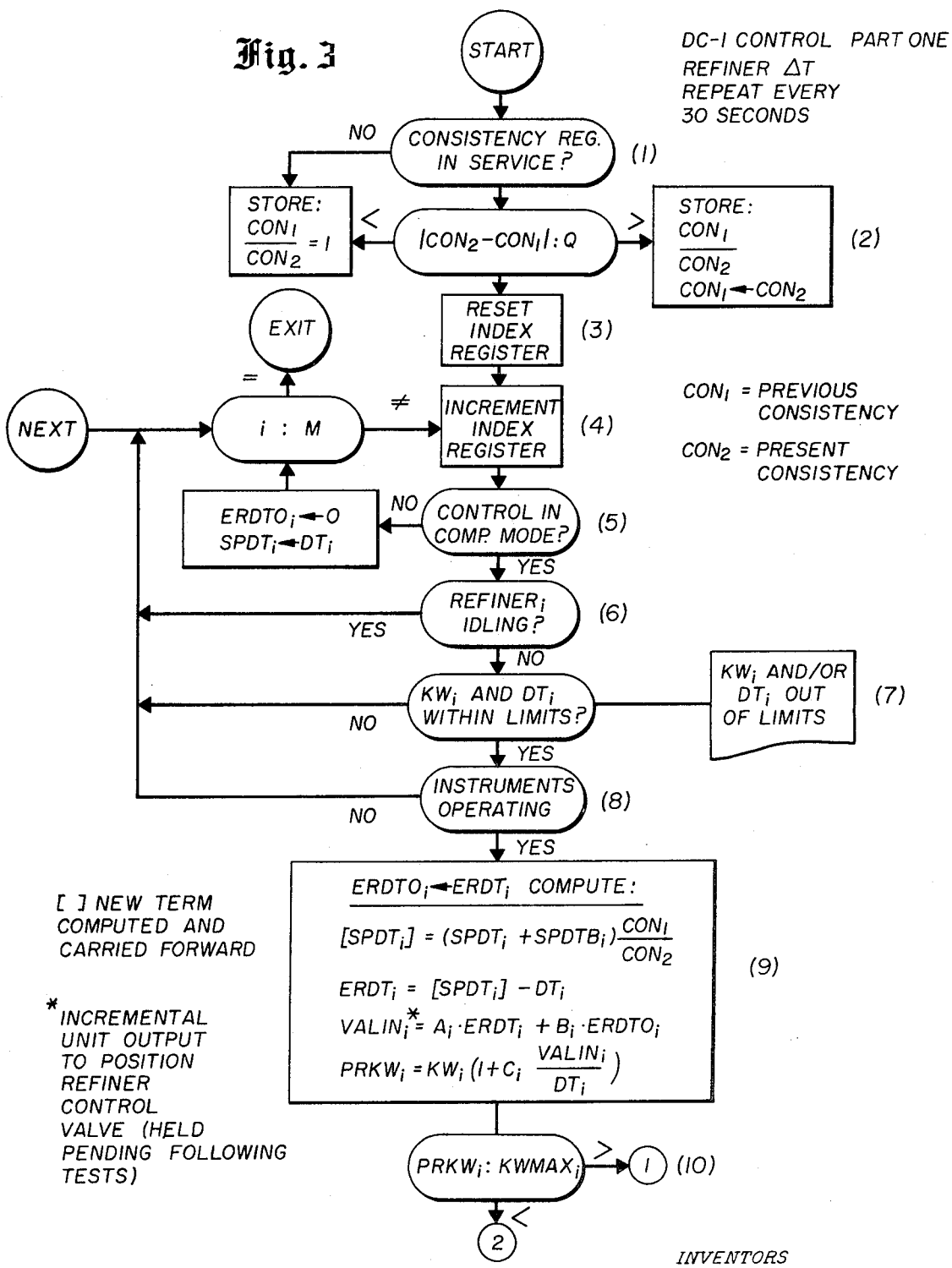
FIGS. 3 and 4 together illustrate a flow chart for one program of the control to be exercised by the digital computer of FIG. 2 for temperature rise of stock through individual refiners.
Figure 4:
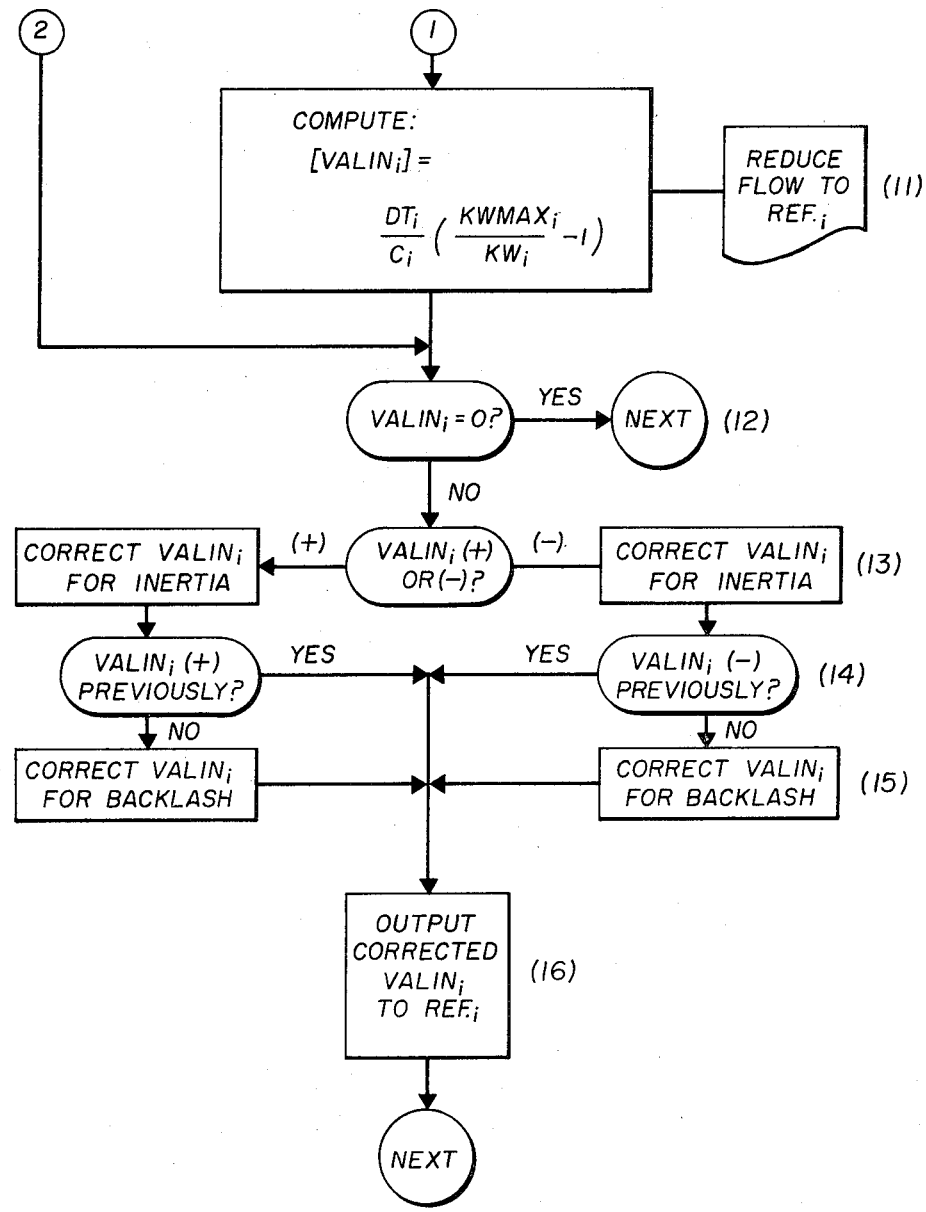

The organization and operation of section DC-1 will now be described with reference to FIGS. 3 and 4, which disclose a programming flow chart for control of the temperature rise of stock through individual refiners. A suitable program (automatically repeated every 30 seconds) may be readily devised for a particular computer to implement the control flow chart. Accordingly, the collection of blocks, lines, arrows and comments taken together indicate what functions are to be performed, just as a block diagram of an electronic system indicates functions performed in a particular organization to achieve a desired result. To avoid any misunderstanding, a somewhat standardized system of symbols has been employed. A block with square corners indicates an operation, or group of operations, and a block with round corners indicates a logical decision to be made on the basis of a test or comparison indicated. Large circles are employed to indicate the beginning (START), reiteration (NEXT), and end (EXIT) of a program. Smaller circles are used to connect remote portions. Lines which indicate the direction of data flow or the next step to be taken in such remote portions of the program are to be connected by joining lines terminating at small circles with like numbers. The major steps of a given program referred to hereinafter are numbered in parentheses next to the operation or decision block(s) involved, and, for convenience, the various signals are considered to be numerical values since, once received by the computer, they are converted from analog to digital form. Thus, signals employed in calculations are digital in the preferred embodiment of the present invention.

The first step to control rise in temperature of stock through refiner i is to determine whether the consistency regulator 15 is in service. If not, the consistency value CON is not meaningful and the next step is to store a value of 1 for the ratio of previous consistency to present consistency. Otherwise, the second step is to determine whether the absolute value of the difference between the previous and present consistency readings is greater than a predetermined deadband value -Q where Q is, for example, 0.15 percent). If the deadband value Q is exceeded, the ratio of previous to present consistency is stored, and present consistency $CON_2$ is substituted in memory for the previous consistency $CON_1$. If the deadband value Q is not exceeded, a value of 1 is stored for the ratio of previous to present consistency.

The third step is to reset the index register to 0, if that has not already been done at the start. The next step is to increment the index register by 1 and then determine whether refiner $i$ (No. 1 is in the computer control mode. If not, the previous error in temperature difference ($ERDTO_i$) is set to 0 and the temperature-rise setpoint ($SPDT_i$) is set equal to the present temperature rise $DT_i$. Since the refiner is not in the computer control mode, the program does not proceed to the next step (6) for that refiner. Instead, the program returns to step 4 and a check is made to determine whether the number in the index register is equal to $n$, where n is the total number of refiners. If so, all of the refiners in the computer control mode will have been operated upon by this program. Accordingly, the program ends at that point (EXIT). If not, the index register is again incremented and the next refiner is checked to determine whether it is in the computer control mode. If so, the program proceeds to step 6, which is to determine whether the refiner is idling. If so, no control is to be exercised over the refiner, and the program returns to step 4 as before. The idling check may be simply a status check of a control switch at the refiner or a comparison of the power ($KW_i$) being consumed by the refiner with a predetermined minimum power.

If the refiner is not idling, the program proceeds to step 7, which is to determine whether the power ($KW_i$) and temperature rise ($DT_i$) signals being read from the refiner through the input/output section 42 (FIG. 2) are within predetermined limits. If not, no control is to be exercised over the refiner and the program returns to step 4. At the same time, a message advising the operator of that status may be typed out. If those signals are within limits, the program proceeds to the next step, which is to determine whether the power and temperature-rise measuring instruments are in operation. If not, the program returns to step 4, and again a message may be typed out advising the operator of that status.

If the power and temperature-rise instruments are operating, the next step 9 is to carry out the calculations indicated, which correspond to the foregoing control equations 1, 2, 3, and 12. However, before doing that, the error in temperature difference ($ERDT_i$) computed the last time the program was run for the refiner is substituted for the previous error in temperature difference ($ERDTO_i$) employed at that time. In that manner, the last computed error is stored as the previous error and a present error is computed.

The control signal $VALIN_i$ computed in step 9 is not transmitted to the refiner through the input/output section 42 of the computer 41 until the predicted power ($PRKW_i$) just calculated is compared in step 10 with a predetermined maximum power ($KWMAX_i$) for the refiner $i$. If the predicted power is greater than the maximum power, the next step 11 shown in FIG. 4 is to compute a new control signal ($VALIN_i$) in accordance with equation 13 set forth hereinbefore. At the same time, a message is provided to the refiner operator to reduce flow of stock through the refiner $i$. If the predicted power is less than the maximum power, the program skips from step 10 to step 12 to determine whether control signal $VALIN_i$ is equal to 0. If so, the program returns to step 4 for the next refiner. The same step 12 is taken for the computed signal ($VALIN_i$) substituted for the original signal $VALIN_i$ in step 11. If the signal $VALIN_i$ is not equal to 0, the next step 13 is to determine whether the $VALIN_i$ signal is positive or negative. If positive, a correction is introduced for inertia of the control element when driven in a positive direction. If the signal $VALIN_i$ is negative, it is corrected for inertia of the control element when driven in the negative direction. The next step 14 is to determine whether the sign of the control signal $VALIN_i$ is the same as the previous time the control program was run for refiner $i$. If not, the next step 15 is to further correct the signal $VALIN_i$ for backlash in the control element.

The last step 16 in controlling refiner i is to output the corrected signal $VALIN_i$ via the input/output section. Following that, the program returns to step 4 for the next refiner ($i + 1$). In that manner, the control element (hydraulic valve) of refiner $i$ is adjusted to correct for any error in temperature rise ($ERDT_i$) if the predicted power is not greater than the maximum power, and to correct for as much of the error as possible within the power limits of the refiner i if the predicted power is greater than the maximum power of the refiner $i$.

DC-2 SECTION

To insure that the freeness of the individual refiners is the same, the freeness of each of the individual refiners is measured periodically in a laboratory test, and the laboratory freeness data signals (represented by terminals $LF_1$, $LF_2$, and $LF_3 \ldots LF_n$ in FIG. 2 for the laboratory freeness of respective refiners 1, 2, 3 ... $n$ of FIG. 1) are entered manually into the computer 41 through its console. The section DC-2 of the computer 42 then computes the weighted average freeness WAFR of all refiners connected to the paper machine 40 in accordance with the following equation:

$$WAFR = \frac{\sum_{i=1}^{n} \frac{KW}{DT_i} \cdot LF_1}{\sum_{i=1}^{n} \frac{KW}{DT_i}} \quad (14)$$

The deviation of each of the refiners from this average is then employed to calculate a bias signal $SPDTB_i$ for the individual refiner setpoint signals $SPDT_i$ in accordance with the following equation:

$$SPDTB_i = H_i(WAFR - LF_i) \qquad 15$$

where $H_i$ is a constant for a one-term digital control algorithm. That bias is employed by the section DC-1 to compute a new setpoint signal ($SPDT_i$) for refiner i in accordance with equation 1. It could be done immediately, in which case a new setpoint signal ($SPDT_i$) would be computed in step 9 of FIG. 3 by simply multiplying the then existing setpoint signal $SPDT_i$ by the ratio of previous to present consistency. An advantage of that method would be the elimination of an addition operation in the DC-1 control program which is repeated every 30 seconds at the expense of adding one addition operation to the DC-2 control program, which includes fetching the signal $SPDT_i$ from memory and storing the sum in the same memory location. Since the election has been made to add the bias signal $SPDTB_i$ in the DC-1 control program, FIG. 2 illustrates the signal $SPDTB_i$ as being transmitted from the computer section DC-2 to the computer section DC-1.

Figure 5:
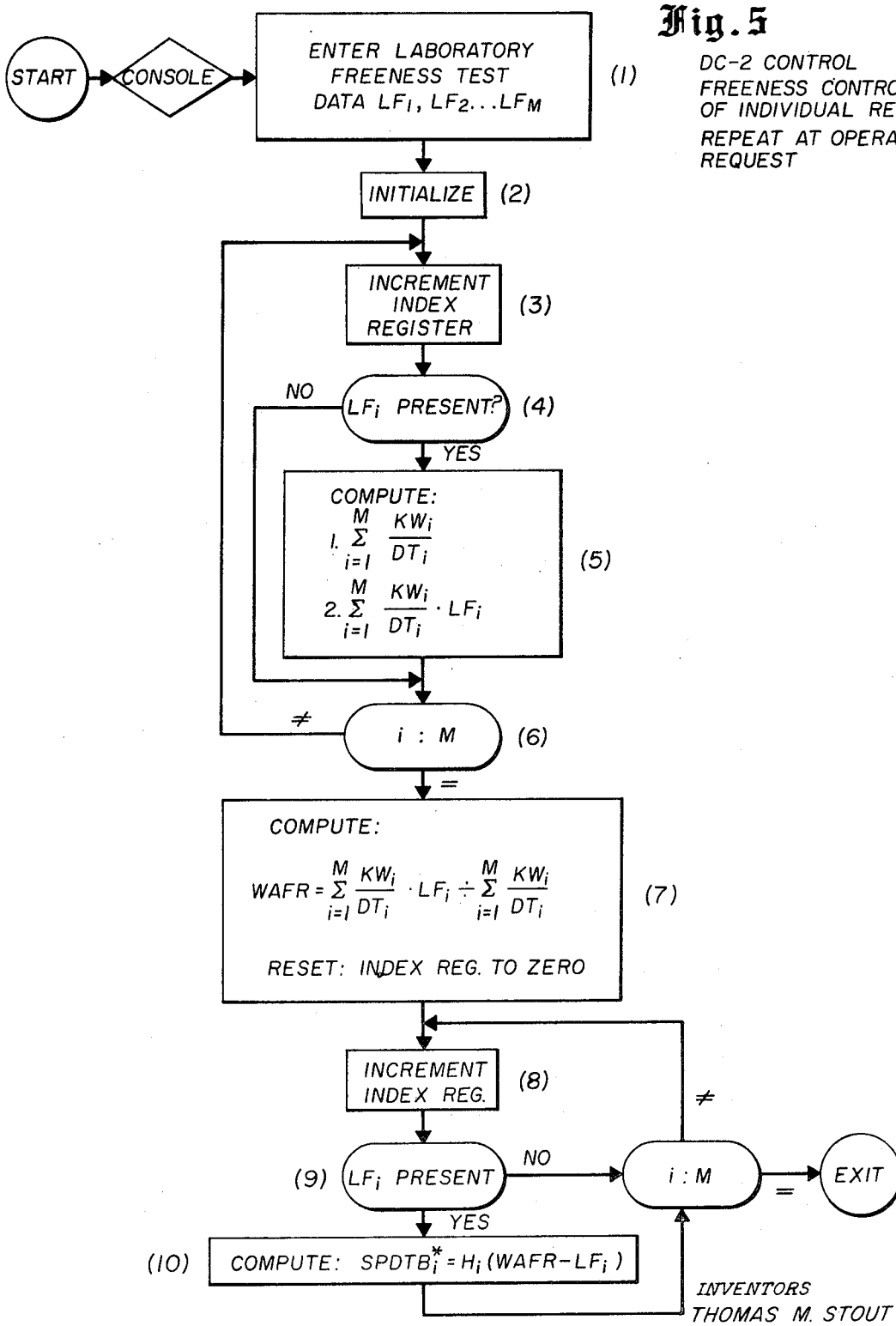
FIG. 5 illustrates a flow chart for a second program of control to be exercised by the digital computer of FIG. 2 for freeness of stock from individual refiners.

The organization and operation of section DC-2 of the computer 41 will now be described with reference to FIG. 5, which discloses a programming flow chart for control of the freeness of stock from individual refiners. As before, the various signals are considered to be numerical values. The program starts at the console by the entry of laboratory freeness test data $LF_1$, $LF_2 \ldots LF_m$. Once the test data has been entered, the second step is to initialize the computer which is to take whatever steps are necessary at the console to prepare the computer to execute the following program. One of the steps is to reset the index register to 0. It should be understood that all of step 2 may in fact be carried out as a stored subroutine.

The next step is to increment the index register to start the control program for the first refiner. Following that, in step 4, a check is made to determine whether laboratory freeness $LF_1$ was entered for the first refiner. If not, the next step 5 is skipped.

In step 5, the ratio of power $KW_i$ to temperature rise $DT_i$ is computed for the first refiner and then stored. Following that, as part of the same computational step, the ratio just computed is multiplied by the laboratory freeness $LF_1$ of the first refiner. That product is then also stored for later use.

The next step 6 is to determine whether the index register has been incremented to the number n equal to the total number of refiners being controlled. If not, the program returns to step 3, where the index register is incremented to call out the next refiner. If laboratory freeness datum is present for that refiner, the ratio of power to temperature rise for the second refiner is added to the corresponding ratio for the first refiner in the computational step 5. Following that, the ratio of power to temperature rise is multiplied by the laboratory freeness of the second refiner, and that product is added to the corresponding product of the first refiner. Steps 3 through 6 are repeated for each of the remaining refiners until the number stored in the index register is found to be equal to the total number of refiners. The program then advances to the next computational step 7.

In step 7, the weighted average freeness of all of the refiners connected in parallel is computed in accordance with equation 14 set forth hereinbefore. At the same time, the index register is reset to 0 in order to go into the last phase of the freeness control program which is designed to compute a correction or bias $SPDTB_i$ to be used in the section DC-1 for calculating a new setpoint $SPDT_i$. In that manner, each of the refiners is corrected for any deviation from the weighted average freeness.

In the first step of the last phase, step 8 of the freeness control program, the index register is incremented to call out the first refiner for control. In the next step 9, a check is again made to determine whether laboratory freeness $LF_1$ has been entered for the first refiner. If not, the next computational step is skipped and a check is made to determine whether the index register has been incremented to a number equal to the total number of refiners. If not, the program returns to step 8, where the index register is again incremented to call out the next refiner. If laboratory freeness datum has been entered for the refiner being called out for control, the program advances to the last step 10, where the setpoint bias ($SPDTB_i$) is computed in accordance with the equation 15 set forth hereinbefore.

Once a bias signal $SPDTB_i$ has been computed for all of the refiners for which laboratory freeness data was entered (i.e., when the index register has been incremented to a number equal to the total number of refiners in the system), the program ends (EXIT). The output from this program ($SPDTB_i$) is stored for use by the section DC-1 in the computations of equation 1 set forth hereinbefore. That is schematically indicated in FIG. 2, as noted hereinbefore.

The control program of the section DC-2 is executed only upon the operator's request and not while either of the automatically repeated programs of sections DC-1 and DC-3 is being executed. Conflict is avoided in the event execution of the program for the DC-2 section is requested while either of the automatically repeated programs is being executed by a priority system in the computer which causes the program of the section DC-2 to be executed only while neither of the automatically repeated programs is being executed. Accordingly, each time the program for the section DC-1 is executed, there will be stored in memory only one bias signal $SPDT_i$ for each of the refiners.

DC-3 SECTION

The composite stock freeness is measured on-line by the freeness analyzer 25 (FIG. 1) in the headbox stock piping and transmitted to the computer 41 as a signal FR. This measurement is compared with a composite-freeness setpoint signal SPFR and the resulting error signal ERFR is used to compute a bias signal SPDTB for all of the refiners in parallel in accordance with the following equations:

$$ERFR = SPFR - FR \qquad 16$$

$$SPDTB = E \cdot ERFR + F \cdot ERFR01 + G \cdot ERFR02 \qquad 17$$

where:
E, F and G are constants stored in the computer 41 for a three-mode algorithm.
ERFR01 is the previous error signal developed by the previous iteration of the program for section DC-3.
ERFR02 is the error preceding the previous error developed by the iteration of the program for section DC-3 preceding the previous iteration.

In the event the freeness analyzer is inoperative, an alternate control scheme is used, if possible. This consists of computing a bias signal SPDTB for all of the refiners in parallel from a change in couch vacuum (CV) in accordance with the following equations:

$$ERCV = SPCV - CV \qquad 18.$$

where SPCV is a couch vacuum setpoint developed as a signal CV by a sensor in the paper machine 40 and entered into the computer the last time the program was run, and ERCV is a signal representing the difference between the previous and the present signal CV; and $$SPDTB = E'ERCV + F'ERCV01 + G'ERCV02 \qquad 19$$

where E', F1, and G1 are constants corresponding to E, F, and G stored in the computer 41. It should be understood that the vacuum of flatboxes (not shown) could be used just as well as the vacuum of the couch 33.

The machine 40 is checked every cycle of the composite freeness control section DC-3 to determine whether any intentional machine changes have been made which would give rise to an error signal ERCV. If there were none, the couch vacuum signal CV is allowed to control composite freeness when the freeness analyzer is off-line. The couch vacuum setpoint signal SPCV is updated each time the composite freeness program is executed with the freeness analyzer on-line so that a more current target value for couch vacuum is available for comparison should use of the alternative composite freeness control be necessary. In addition, refiners may be controlled manually by the machine operator via the computer console (represented in FIG. 2 by terminal ΔFR). The operator simply enters an incremental freeness change signal ΔFR into the computer which treats it as a computed bias signal SPDTB.

Once the DC-3 control section computes a bias signal SPDTB for all refiners in parallel from an error signal ERCV, or receives a manual input signal ΔFR which it converts into a bias signal SPDTB, the control section computes the individual biases for the refiners in accordance with the following equation:

$$SPDTB_i = D_i \cdot SPDTB \qquad 20.$$

where $D_i$ is a gain coefficient for the individual refiner stored in the computer 41.

After a preliminary control limit test, some predicted power tests are made based on the computed bias signal $SPDTB_i$. If power limits would not be exceeded, a new setpoint signal ($SPDT_i$) is computed in accordance with equation 1 set forth hereinbefore; or if the predicted power is below a predetermined lower limit, but the present setpoint signal $SPDT_i$ is not less than 0.2° below the actual temperature rise signal $DT_i$ then present, a new setpoint signal ($SPDT_i$) is computed. In either case, computation of a new setpoint signal constitutes a control output via section DC-1 where the new setpoint signal ($SPDT_i$) is then read from memory as the current setpoint signal $SPDT_i$ for computations in step 9 resulting in a refiner control signal $VALIN_i$ as described hereinbefore with reference to FIGS. 3 and 4. Accordingly, a control output from section DC-3 to DC-1 is schematically represented in FIG. 2 as a signal transfer in the form of a temperature-rise setpoint signal $SPDT_i$, and in any case a further power check is made to determine whether refiners should be added or removed for optimum efficiency.

The organization and operation of section DC-3 will now be described with reference to FIGS. 6 and 7, which disclose a programming flow chart for composite freeness of stock from all refiners in parallel. Again, the various signals are treated as numerical values. The first step is to determine whether the freeness analyzer 25 (FIG. 1) of the paper machine is on-line. If not, the program branches to an alternate subroutine, which will be described hereinafter with reference to FIG. 7. If the freeness analyzer is on, the next step is to compute the difference between the freeness setpoint SPFR and the current freeness measurement FR from the freeness analyzer and, using that error ERFR, compute a setpoint bias SPDTB to be applied equally to all refiners, all in accordance with equations 16 and 17 as set forth hereinbefore.

In the next step, the present couch vacuum measurement (CV) is substituted for the couch vacuum setpoint SPCV and the previous error in couch vacuum ERCV is set to zero. This is done at this time since in step 1 it was determined that the freeness analyzer was on-line and couch vacuum is not to be used as an alternative measurement for composite freeness. If the freeness analyzer is not on, the program branches from step 1 to the alternate composite freeness control routine in FIG. 7, where the first step 1a is to determine whether it is permissible to use couch vacuum as an alternative measurement of composite freeness. This step may consist of simply checking the status of a flag (a binary digit stored in memory) which is controlled by a separate subroutine or may instead include the separate subroutine which consists of simply checking for any changes in paper machine speed, freeness, basis weight, headbox flow, and the like, which would cause a change in couch vacuum. If none of these has been changed significantly since the last time the composite freeness control program was run, the couch vacuum flag is set indicating that any change in couch vacuum is a real change in freeness. If the subroutine is not run as an integral part of the composite freeness program, but rather as a separate program, such a separate program should be scheduled for repetition at the same rate as the composite freeness control program (once every 5 minutes) and preferably just before the composite freeness control program is called up for execution.

In the usual case, the freeness analyzer will be on-line so that the alternate composite freeness routine is reached only occasionally. Therefore, in order to be able to check the validity of changes in couch vacuum indicating real changes in freeness, it is necessary to have the status of these variable factors updated each time the composite freeness program is run. That may be done following the composite freeness program if the couch vacuum checking routine is included in step 1a of the alternate composite freeness program, as shown in FIG. 7. If a separate couch vacuum checking program is provided to precede each composite freeness control program execution, the desired updating of the status of these factors may be accomplished at that time.

Once it is determined that couch vacuum may be used as an alternative control of freeness, the next step $2a$ is to compute an error in couch vacuum ERCV and from that a bias signal SPDTB in accordance with equations 18 and 19 set forth hereinbefore, but first the error in couch vacuum computed the last time the alternate composite freeness control program was run is transferred to a memory location where the previous error in couch vacuum ERCV01 is stored and the error in couch vacuum stored there is transferred to a memory location where the couch vacuum error previous to that is stored. The signal SPDTB thus computed by the alternate composite freeness control routine is then carried forward through steps 4 to 8 of the composite freeness control program shown in FIG. 6.

If it is not permissible to use couch vacuum for the alternate composite freeness control program, the next alternative step is to determine whether a manual change in freeness has been entered by the operator at the console. If so, that change in freeness is converted to a bias signal SPDTB and carried forward through steps 3 to 8 of the composite freeness control program shown in FIG. 6. If no change in freeness has been entered manually, the bias signal SPDTB is set equal to 0 and that value is then carried forward through steps 3 to 8 of the composite freeness control program. At the same time, a typewritten message is preferably provided to the operator that freeness is not on computer control.

Figure 6:
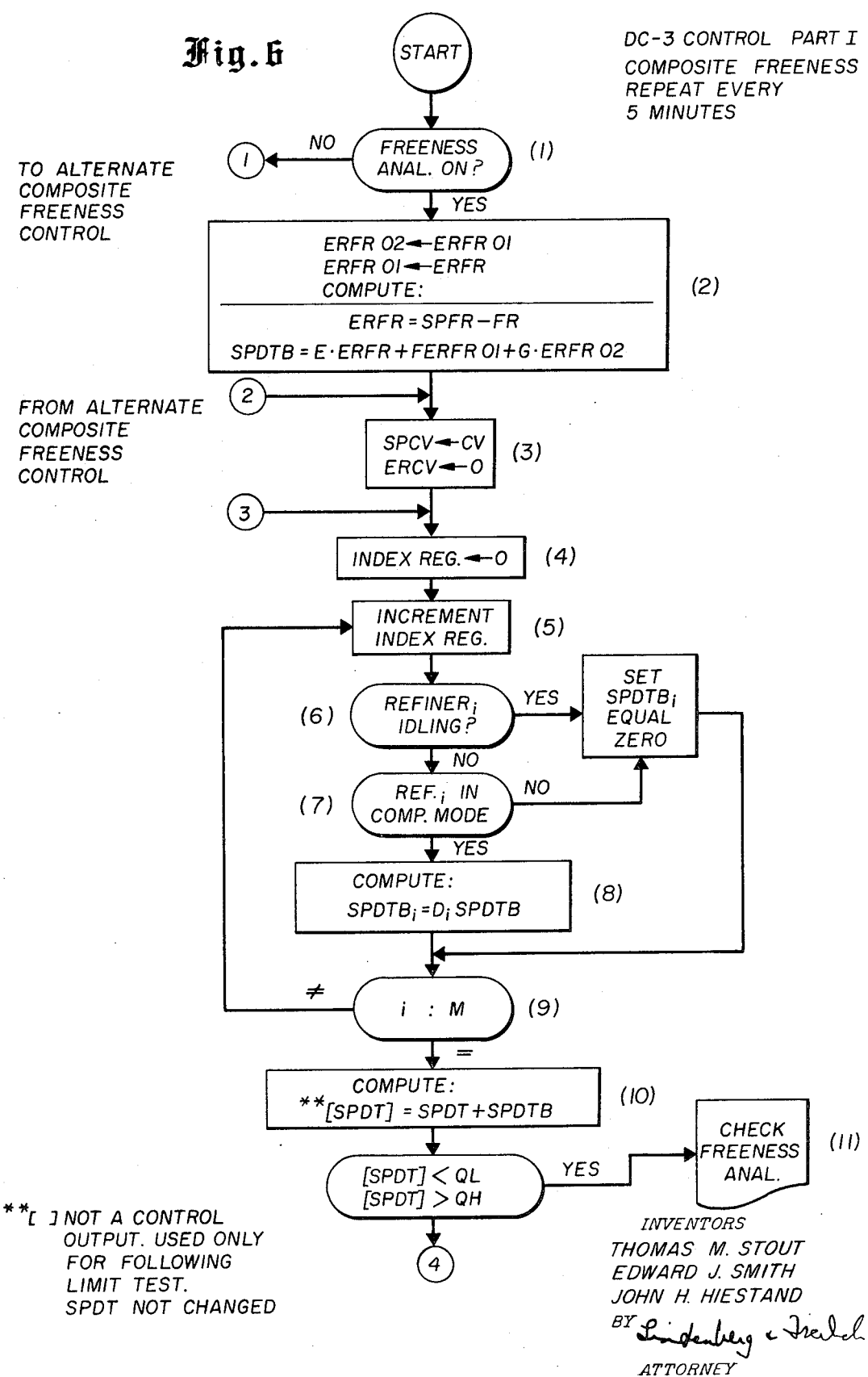
FIGS. 6 and 7 illustrate a flow chart for a third program of control to be exercised by the digital computer of FIG. 2 for composite freeness of stock from parallel refiners.

Once a bias signal SPDTB has been provided by one of the three alternative methods and the index register has been reset to 0 in step 4 of the composite freeness control program shown in FIG. 6, the index register is incremented to call up the first refiner for a change in its temperature-rise setpoint, but first, in step 6, a check is made to see whether the refiner is idling. If so, the bias signal $SPDTB_i$ for that refiner is set equal to 0. If not, the program proceeds to step 7, where a check is made to determine whether the refiner is in the computer control mode. If not, again the signal $SPDTB_i$ is set equal to 0 as in step 6. In either case, if the refiner is idling or is not in the computer control mode, the computational step 8 is omitted.

In the computational step 8, the signal SPDTB is multiplied by a gain coefficient $D_i$ to provide a bias signal $SPDTB_i$. Following that, in step 9, a check is made to determine whether the index register has been incremented to a number equal to the total number of refiners in this system. If not, the program returns to step 5; but, if so, the program proceeds to the next step 10.

In computational step 10, the general bias signal SPDTB is added to a general temperature-rise setpoint SPDT to which all previous general bias signals have been added to derive a new general temperature rise setpoint (SPDT). That value is used only for making certain limit tests on changes made on the temperature-rise setpoints of the refiners through the composite freeness control program. Thus, in the next step 11, a check is made to determine whether that value (SPDT) is greater than or less than respective upper and lower limits $Q_H$ and $Q_L$. Thus, steps 10 and 11 provide "trend checking" on the freeness analyzer. If the cumulative change in temperature-rise setpoint SPDT exceeds a fixed amount, i.e., the cumulative change in freeness exceeds a fixed amount, in either direction, a message is typed out to check the freeness analyzer.

Figure 7:
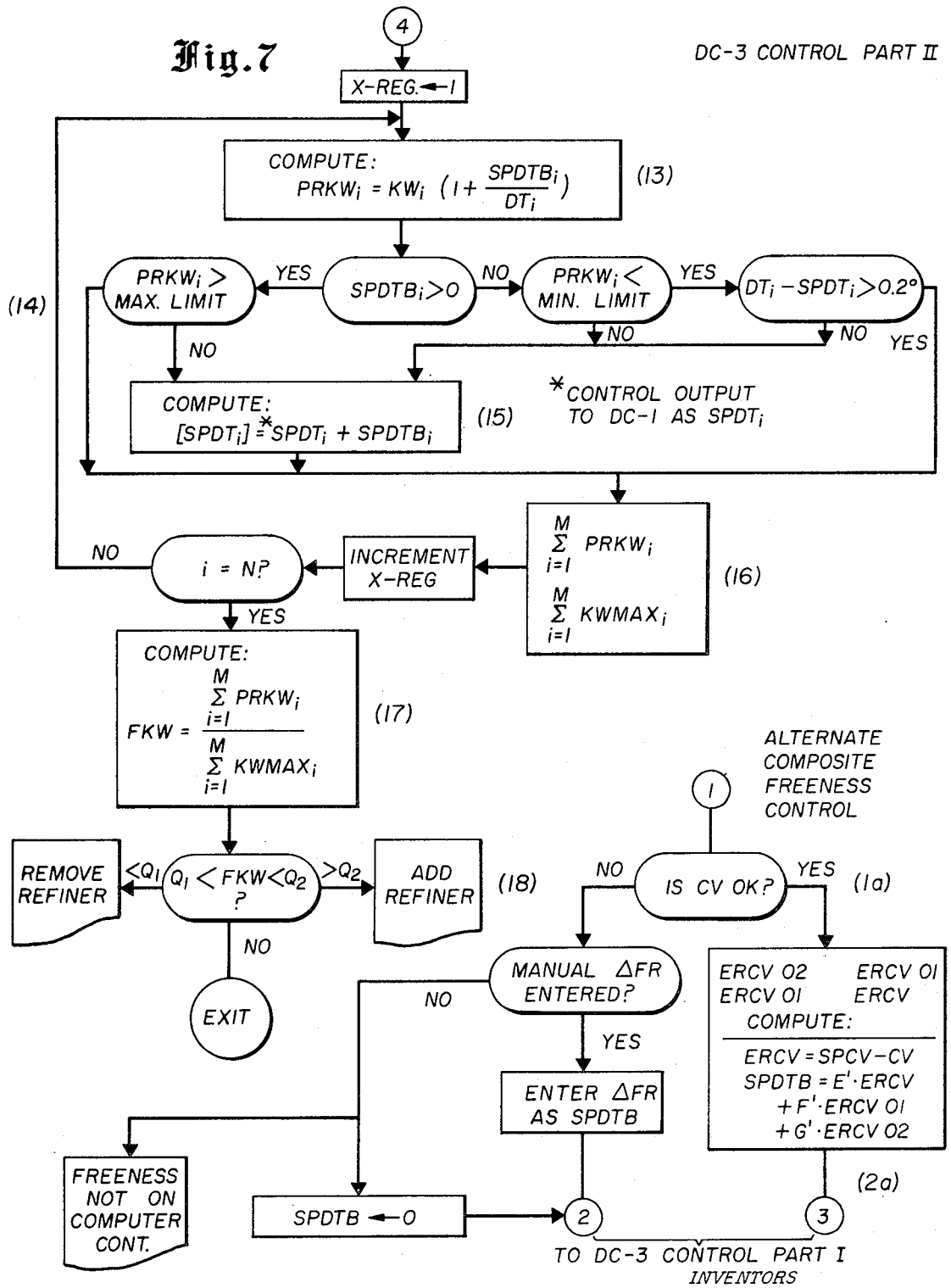

In the second part of the composite freeness control program shown in FIG. 7, some power checks are made, and new setpoints ($SPDT_i$) for the refiners are computed if power limits are not exceeded. Following that, as noted hereinbefore, a fractional power check is made to determine whether refiners should be added or removed for optimum efficiency. All that is accomplished by first setting the index register to number 1 in step 12 to call out the first refiner for power checking and then, in step 13, computing the predicted power change in accordance with the following equation:

$$PRKW_i = KW_i(1 + SPDTB_i/DT_i) \qquad 21$$

The bias signal for the temperature rise $SPDTB_i$ is obtained from step 8 (FIG. 6) and the present rise in temperature $DT_i$ as well as the actual power $KW_i$ are read directly from the refiner through the input/output section 42 of the computer.

In the next step 14, the bias signal $SPDTB_i$ is first checked to see whether it is greater than 0, i.e., whether it is positive. If so, a check is then made to determine whether the predicted power $PRKW_i$ is greater than a maximum limit, and, if not, a check is then made to determine whether the predicted kilowatt power is less than a minimum limit. If the predicted power $PRKW_i$ is neither greater than the maximum limit nor less than the minimum limit, the next step 15 is to compute a new temperature-rise setpoint $SPDT_i$ for the refiner i, which is then used as the temperature-rise setpoint $SPDT_i$ in computational step 9 of the section DC-1 the next time it is executed. In that manner, the bias signal $SPDTB_i$ computed by the composite freeness program introduces a change in the temperature-rise control of the individual refiners.

If the predicted power $PRKW_i$ is found to be less than a minimum limit, a further check is made to determine whether the setpoint $SPDT_i$ is less than 0.2° below the actual temperature rise $DT_i$. If not, the program proceeds with a computational step 15; but, if so, no change is made in the temperature-rise setpoint $SPDT_i$ for the refiner i as a result of executing this composite freeness control program.

Once the new setpoint ($SPDT_i$) has been computed in step 15 for use as the setpoint $SPDT_i$ in the section DC-1, or it has been determined that such a new setpoint is not to be computed, either because the predicted power is greater than a maximum limit or if the predicted power is less than a minimum limit, it is determined that the setpoint $SPDT_i$ is less than 0.2° below the actual temperature rise $DT_i$, the next step 16 is to add the predicted power $PRKW_i$ to the sum of predicted powers for all other refiners, and to similarly add the maximum power $KWMAX_i$ to the maximum power of all other refiners. The index register is then incremented and checked to determine whether the number stored therein is equal to the total number of refiners in the system. If not, steps 13 through 16 are repeated. If so, the next step is to compute fractional power FKW in accordance with the following equation:

$$FKW = \frac{\sum_{i=1}^{m} PRKW_i}{\sum_{i=1}^{m} \frac{PRKW_i}{KWMAX_i}} \qquad (22)$$

Following that computational step, 17, the fractional power FKW is compared with respective lower and upper limits $Q_1$ and $Q_2$. If the fractional power is less than the lower limit $Q_1$, a message is typed out to remove a refiner. If, on the other hand, the fractional power is found to be greater than the upper limit $Q_2$, a message is typed out to add a refiner. In that manner, the fractional power KW can be maintained within limits $Q_1$ and $Q_2$ for optimum efficiency.

DC-4 SECTION

Mullen (bursting strength) in pounds of force per square inch is an important characteristic by which paper is graded and sold. Since stock freeness and dry basis weight have an effect on this characteristic, periodic Mullen tests are made, while moisture and basis weight measurements are made continuously with commercial sensors. Moisture is then subtracted from basis weight to obtain dry basis weight for Mullen control. Many samples of the basis weight (BW) and moisture (MO) signals are taken and averaged to compute a dry basis weight signal DBW. That is best done automatically by the computer using on-line transducers for moisture and basis weight. 20 Mullen tests are made across a sample, ten tests on a side. The test data for the sample are averaged, and only the average is entered manually as a signal MN (as represented by a dotted line MN in FIG. 2). However, it may be desirable in some installations to enter all Mullen test data and provide a program to compute the average just ahead of the DC-4 program. Each of the measured characteristics is then compared with desired characteristics in accordance with the following equations:

$$ERMN = SPMN - MN \quad 23$$

$$ERBD = SPDBW - DBW \quad 24$$

where:
SPMN is the desired Mullen signal manually entered and stored in the computer;
SPDBW is the desired dry basis weight signal manually entered and stored in the computer; and
ERMN and ERDBW are errors in Mullen (MN) and dry basis weight (DBW) signals, respectively.

The errors are then employed to compute a freeness setpoint bias signal SPFRB in accordance with the following equation:

$$SPFRB = I \cdot ERMN + J \cdot ERDBW \quad 25$$

where I and J are each proportional factors stored in the computer 41 for two one-mode algorithms combined in one equation.

The bias signal SPFRB could then be transmitted to the DC-3 section for modifying the freeness setpoint signal SPFR at the beginning of the composite freeness control program, but, since the latter is executed periodically and the program of the DC-4 only on demand, it is more efficient to modify the setpoint signal SPFR at the conclusion of the DC-4 program in accordance with the following equation:

$$[SPFR] = SPFR + SPFRB \quad 26.$$

The new setpoint signal [SPFR] is then stored in the computer memory for recall at the start of the DC-3 program.

Figure 8:
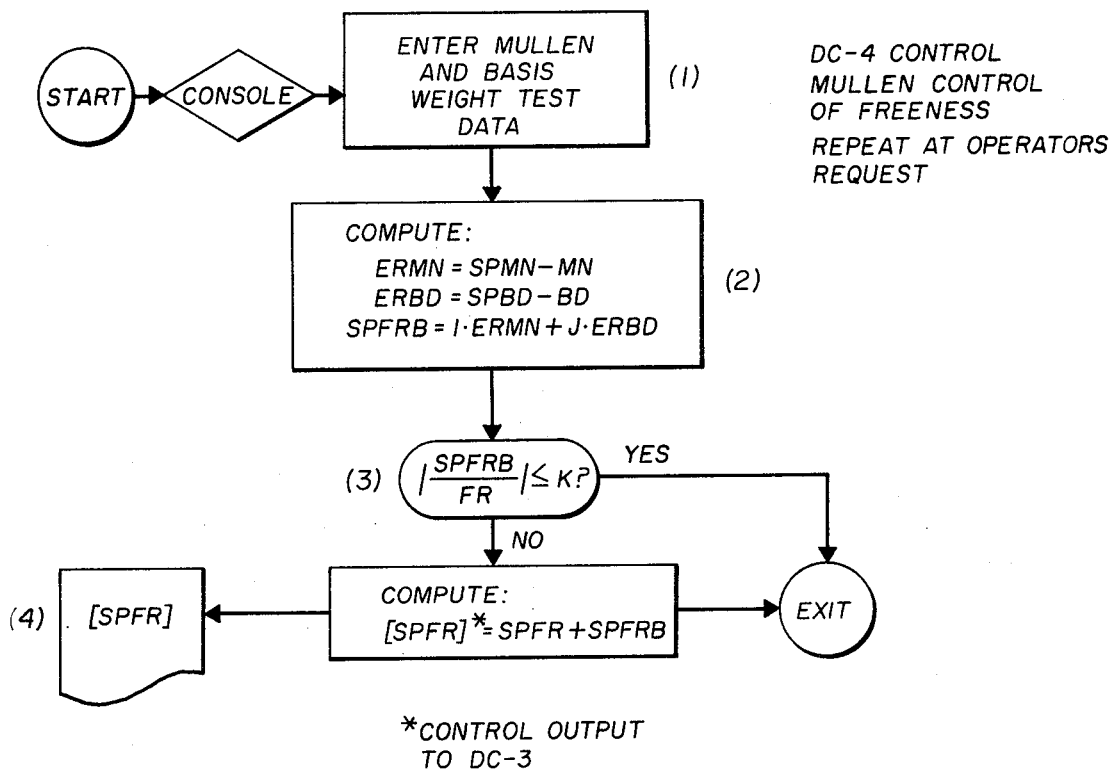
FIG. 8 illustrates a flow chart for a fourth program of control to be exercised by the digital computer of FIG. 2 for Mullen.

The organization and operation of section DC-4 will now be described with reference to FIG. 8, which discloses a programming flow chart for Mullen control of freeness. Here again, the signals are considered numerical values. The program starts at the console where, in step 1, the value MN is entered. On-line sensors 50 and 51 for moisture and total basis weight values are provided, as shown in FIG. 2. The computation then necessary for obtaining the dry basis weight DBW is carried out either by a subroutine as part of step 1 or a program which immediately precedes the Mullen control program. The computation consists of simply subtracting average moisture values MO from average basis weight values BW. The sensor 50 for moisture may be an electrical resistance or capacitance bridge with the paper constituting one branch of the bridge. The resistance or capacitance of paper is influenced by such factors as pH and temperature, but those factors do not vary sufficiently to require correction. The sensor 51 for basis weight customarily used is a $\beta$-ray gauge. $\beta$-ray absorption is also influenced by various factors including temperature, but again the factors do not vary sufficiently to require correction. If such factors are found to be varying sufficiently to influence moisture and basis weight measurements, laboratory measurement of dry basis weight may be made. The data could then be entered with the Mullen test data. However, sampling of on-line transducers via the input/output section 42 is generally adequate for moisture and basis weight values required to compute dry basis weight for Mullen control.

Once the test data are entered and available for computation, the program proceeds to the next step, where error in Mullen ERMN and error in dry basis weight ERDBW are computed, and from those errors a bias for the freeness setpoint is calculated, all in accordance with equations set forth hereinbefore. In the third step, a ratio of the bias signal SPFRB just computed in step 2 to the present freeness FR is compared with a constant K (stored in the computer 41) which is preferably specified to be 0.02. If the ratio is equal to or less than that value, no correction is to be made on freeness and the program ends. However, if the ratio is greater than that value, a new freeness setpoint SPFR is computed by adding the bias value SPFRB to the present freeness setpoint SPFR. The new freeness setpoint SPFR is then used to calculate the error in freeness ERFR in step 2 of the composite freeness control program (section DC-3), and from that a new temperature-rise setpoint ($SPDT_i$) for each refiner, as described hereinbefore with reference to FIGS. 6 and 7. Thus, a new setpoint for freeness (SPFR) is provided by section DC-4 as a control in the form of data transfer to section DC-3, as schematically represented in FIG. 2.

The manner in which such programs are called up for execution cyclically is well known to those skilled in the art. Typically, a digital clock within the computer is employed. As each three-second interval is detected, a flag (flip-flop) is set in response to which a priority system interrupts any program then in progress to execute the DC-1 program. The priority system similarly interrupts any program in progress for the DC-3 program. The time set for that is preferably between the times set for the DC-1 program; otherwise care must be taken to award the DC-1 program priority over the other. The program of the DC-2 section is called on demand of the operator through the computer console after the laboratory freeness data are manually entered. For that reason, it is given lower priority than the programs of the DC-1 and DC-3 sections. The program of the DC-4 section is similarly called on demand. No conflict between that and the program of the DC-2 section will exist, since each is under control of the operator.

Although particular embodiments of the invention have been illustrated and described herein, it is recognized that modifications and variations will occur to those skilled in the art and, consequently, it is intended that the scope of the invention be determined only by a just interpretation of the appended claims.

The embodiments of the invention in which an exclusive property or privilege is claimed are defined as follows:

1. A paper manufacturing system including apparatus for controlling refiner operation to maintain freeness of stock to a headbox constant, said refiner having an adjustable element responsive to a position setpoint signal for varying work done therein on said stock, whereby freeness is controlled as a function of work done, said apparatus comprising:
   first means for developing a signal representative of the rise in temperature of stock being put through said refiner;
   second means for developing a signal representative of the consistency of stock being put through said refiner; and
   third means connected to said first and second means and responsive to signals developed therein for so developing said position setpoint signal as to vary the rise in temperature of stock being put through said refiner in such a manner as to maintain the ratio of temperature rise to consistency substantially constant.

2. Apparatus as defined by claim 1 wherein said third means includes a computing means for developing a new position setpoint signal as the product of the present position setpoint signal and a ratio of a previous consistency signal to a present consistency signal developed by said second means.

3. Apparatus as defined by claim 2 wherein said third means includes means for comparing the absolute value of the difference between said previous and present consistency measurement signals with a predetermined value and means responsive to said comparing means for effectively inhibiting calculation of a new position setpoint signal when said difference is not greater than said predetermined value.

4. Apparatus as defined by claim 2 wherein said third means includes means for altering said present position setpoint signal with a bias signal by adding to said position setpoint signal said bias signal and multiplying the sum by the ratio of said previous consistency signal to the present consistency signal.

5. Apparatus as defined by claim 2 wherein said third means includes means for calculating the difference between said new position setpoint signal and the signal developed by said first means as representative of present temperature rise and calculating a control signal VALIN as a function of said difference, and said adjustable element is responsive to said control signal.

6. Apparatus as defined by claim 5, wherein said third means includes means for predicting the power to be consumed by said refiner after said adjustable element is positioned by said control signal VALIN and for comparing the predicted power PRKW with the predetermined maximum power KWMAX, and means for calculating a new control signal [VALIN] if said predicted power exceeds said maximum power KWMAX to so position said adjustable element in response thereto as to load said refiner to just said maximum power.

7. Apparatus as defined by claim 6 including means for measuring power KW being consumed by said refiner and wherein said predicted power PRKW and said new control signal [VALIN] are calculated in accordance with the following equations:

$$PRKW = KW\left(1 + \frac{C \cdot VALIN}{DT}\right)$$

$$[VALIN] = \frac{DT}{C}\left(\frac{KWMAX}{KW} - 1\right)$$

where C is a coefficient for converting VALIN into units of change in temperature rise to result from response of said adjustable element to said control signal [VALIN], and DT is the present rise of temperature signal developed by said first means.

8. Apparatus as defined by claim 1 wherein a plurality of refiners are connected in parallel to furnish stock to said headbox, and wherein said third means controls the adjustable element of said refiners in sequence, each to so vary the temperature of stock being put through it as to maintain the ratio of temperature rise to consistency of stock furnished to all refiners substantially constant.

9. Apparatus as defined by claim 8 wherein said third means includes a computing means for calculating a new position setpoint signal for each refiner as the product of its present position setpoint signal and a ratio of a previous consistency signal to a present consistency signal developed by said second means.

10. Apparatus as defined by claim 9 wherein said third means includes means for altering said present position setpoint signal of each refiner with a separate bias signal by adding to said present position setpoint signal of each refiner a separate bias signal and multiplying the sum by the ratio of said previous consistency signal to the present consistency signal.

11. Apparatus as defined by claim 10 wherein said third means includes means for calculating for each refiner the difference between its new position setpoint signal and its temperature-rise signal developed by said first means, and calculating said control signal for said adjustable element thereof as a function of said difference.

12. Apparatus as defined by claim 11 including:
   means for providing a signal representative of an average freeness of individual freeness measurements made of stock from each refiner; and
   means for developing said bias signal for each refiner as a function of the difference between said average freeness and the freeness of stock from respective refiners.

13. Apparatus as defined by claim 11 including:
   means for measuring the freeness of composite stock furnished to said headbox from said plurality of refiners in parallel and for developing a signal representative of such composit freeness;

means for calculating the difference between the value of said composite-freeness signal and a predetermined composite-freeness value; and means for developing said bias signal for each refiner as a function of said composite-freeness difference.

14. Apparatus as defined by claim 12 including:

means for measuring the freeness of composite stock furnished to said headbox from said plurality of refiners in parallel and for developing a signal representative of such composite freeness;

means for calculating the difference between the value of said composite-freeness signal and a predetermined composite-freeness value; and means for further developing said bias signal for each refiner as a function of said composite-freeness difference.

15. Apparatus as defined by claim 11, wherein said paper mill employs a Fourdrinier machine, and including:

means for measuring vacuum to said machine as a measure of freeness of composite stock from said plurality of refiners in parallel, and for developing a signal representative of such composite freeness;

means for calculating the difference between the value of said vacuum signal and a predetermined vacuum; and means for developing said bias signal for each refiner as a function of said vacuum difference.

16. Apparatus as defined by claim 13 wherein said mill employs a Fourdrinier machine, and including as an alternative composite-freeness control when said composite-freeness measurement is not available:

means for measuring vacuum to said machine as a measure of freeness of composite stock from said plurality of refiners in parallel, and developing a signal representative of such composite freeness;

means for calculating the difference between the value of said vacuum signal and a predetermined vacuum; and means for developing said bias signal for each refiner as a function of said vacuum difference.

17. Apparatus as defined by claim 16 including:

means for providing a signal representative of an average freeness of individual freeness measurements made of stock from each refiner; and means for developing said bias signal for each refiner as a function of the difference between said average freeness and the freeness of stock from respective refiners.

18. Apparatus as defined by claim 13 including:

calculating means into which signals representative of measurements of specified characteristics of paper delivered by said mill are transmitted for determining differences between said measurements and predetermined specifications relating to said characteristics, and in response thereto for calculating a change in said predetermined composite-freeness value and adding said change thereto.

19. Apparatus as defined by claim 18 wherein said characteristics pertain to bursting strength.

20. Apparatus as defined by claim 12 wherein said average freeness is a weighted average freeness, and the weighting factor for each refiner is proportional to the rate of stock flow therethrough.

21. Apparatus as defined by claim 20 wherein said weighting factor is a ratio of power being consumed by each refiner to the temperature rise of stock therethrough.

22. Apparatus for controlling a plurality of parallel refiners in a paper mill to maintain freeness of stock to a headbox constant, each of said refiners having an adjustable element responsive to a positioning signal for varying work done therein on said stock, whereby freeness in controlled as a function of work done, said apparatus comprising:

first means for measuring the rise in temperature of stock being put through individual ones of said refiners;

second means connected to said first means for so controlling said adjustable element of each of said refiners as to maintain the rise in temperature of stock being put through said refiner at a predetermined setpoint $SPDT_i$, where the subscript $i$ refers to a given refiner;

third means for altering said predetermined setpoint $SPDT_i$ by a bias $SPDTB_i$;

fourth means for calculating an average freeness of individual freeness measurements made of the stock output of each refiner; and fifth means for calculating said bias $SPDTB_i$ for refiner $i$ as a function of the difference between said average freeness and the freeness of stock from refiner $i$.

23. Apparatus as defined in claim 22 wherein said average is a weighted average, and the weighting factor employed for each refiner is proportional to rate of stock flow therethrough.

24. Apparatus as defined in claim 23 wherein said weighting factor is the ratio of power $KW_i$ being consumed by the refiner $i$ to the rise in temperature $DT_i$ of stock therethrough.

25. Apparatus as defined in claim 22 wherein said third means includes:

means for calculating predicted power consumption of refiner $i$ which would result from the setpoint $SPDT_i$ being altered by said input $SPDTB_i$;

means for comparing said predicted power with a predetermined maximum power loading for said refiner; and means responsive to said power comparing means for allowing said second means to control said adjustable element to said altered setpoint if said predicted power does not exceed said maximum power, and for allowing said second means to control said adjustable element to load said refiner only to its maximum power if said predicted power does exceed said maximum power.

26. Apparatus as defined in claim 25 wherein said third means includes means for signaling a reduction in stock flow rate to refiner i if said predicted power does exceed said maximum power.

27. Apparatus for controlling a plurality of parallel refiners in a paper mill to maintain freeness of stock to a headbox constant, each of said refiners having an adjustable element responsive to a positioning signal for varying work done therein on said stock, whereby freeness is controlled as a function of work done, said apparatus comprising:

first means for measuring the rise in temperature of stock being put through individual ones of said refiners;

second means connected to said first means for controlling said adjustable element of each of said refiners so as to maintain the rise in temperature of stock being put through said refiner at a predetermined setpoint, $SPDT_i$ where the subscript $i$ refers to a given refiner;

third means for altering said predetermined setpoint $SPDT_i$ by a bias $SPDTB_i$;

fourth means for calculating predicted power consumption of refiner $i$ which would result from the set point $SPDT_i$ being altered by said bias $SPDTB_i$;

fifth means for comparing said predicted power with a predetermined maximum power loading for said refiner $i$; and sixth means for allowing said second means to control said adjustable element to load said refiner only to its maximum power if said predicted power does exceed said maximum power.

28. Apparatus for controlling a plurality of parallel refiners in a paper mill to maintain freeness of stock to a headbox constant, each of said refiners having an adjustable element responsive to a positioning signal for varying work done therein on said stock, whereby freeness is controlled as a function of work done, said apparatus comprising:

first means for measuring the rise in temperature of stock being put through individual ones of said refiners;

second means connected to said first means for controlling said adjustable element of each of said refiners so as to maintain the rise in temperature of stock being put through said refiner at a predetermined setpoint $SPDT_i$ where the subscript $i$ refers to a given refiner;

third means for altering said predetermined setpoint $SPDT_i$ by a bias $SPDTB_i$;

fourth means for calculating predicted power consumption of refiner $i$ which would result from the setpoint $SPDT_i$ being altered by said bias $SPDTB_i$;

fifth means for summing the predicted power of all refiners;

sixth means for calculating the fractional power being consumed as a ratio of the sum of the predicted power of all refiners to the sum of predetermined maximum power loading of all refiners;

seventh means for comparing said fractional power with a predetermined fractional power lower limit; and eighth means for indicating a refiner should be removed when said fractional power is less than said lower limit.

29. Apparatus as defined in claim 28 including means for comparing said fractional power with a predetermined fractional-power upper limit and means for indicating a refiner should be added when said fractional power is greater than said upper limit.

30. In a process for producing paper, controlling freeness of stock furnished to a paper machine from a refiner by the steps of:

maintaining the temperature rise of stock through the refiner at a predetermined setpoint;

monitoring the consistency of stock being put through said refiners; and automatically adjusting said setpoint to maintain substantially constant the ratio of said temperature rise to consistency of stock into said refiner.

31. In a process for producing paper, controlling freeness of stock furnished to a paper machine from a plurality of refiners in parallel by the steps of:

maintaining the temperature rise of stock through each refiner at a predetermined setpoint, each refiner having its own set point;

monitoring the consistency of stock being put through said refiners; and automatically adjusting said setpoint of each refiner to maintain substantially constant the ratio of temperature rise of stock therethrough to consistency of stock to all of said refiners.

32. A process as defined by claim 31 including the steps of:

comparing the freeness of the composite stock from said refiners with a desired freeness value; and uniformly adjusting said setpoint of each refiner to correct for any difference between the desired freeness value and the freeness of said composite stock.

33. A process as defined by claim 31 including the steps of:

calculating the average freeness of stock from individual ones of said refiners;

comparing the calculated average freeness with the freeness of stock from each refiner; and adjusting said setpoint of each refiner to correct for any differences between the calculated average freeness and the freeness of stock therefrom.

34. A process as defined by claim 33 including the steps of:

comparing the freeness of the composite stock from said refiners with a desired freeness value; and uniformly adjusting said setpoint of each refiner to correct for any difference between the desired freeness value and the freeness of said composite stock.

35. A process as defined by claim 33 wherein said average freeness is a weighted average freeness, and the weighting factor for each refiner is proportional to the rate of flow of stock the rethrough.

36. A process as defined by claim 35 wherein said weighting factor is a ratio of power being consumed by each refiner to the temperature rise of stock therethrough.

37. A process as defined by claim 32 including alternative steps for adjusting said setpoint when the freeness of the composite stock from said refiners is not avoidable consisting of:

comparing the couch vacuum of the Fourdrinier machine with a couch vacuum value corresponding to the desired freeness value; and uniformly adjusting said setpoint of each refiner to correct for any differences between couch vacuum and the couch vacuum value corresponding to the desired freeness value.

38. Apparatus for controlling a plurality of parallel refiners in a paper mill to maintain freeness of stock to a headbox constant, each of said refiners having an adjustable element for varying work done thereon said stock, whereby freeness is controlled as a function of work done, said apparatus comprising:

computational means for receiving signals representing variables measured by sensors connected to said refiners and signals representing other data pertaining to operation of said apparatus, and for carrying out computational steps utilizing said signals;

separate control means connected to each of said refiners for so controlling said adjustable element thereof as to maintain the rise in temperature of stock being put therethrough at a predetermined setpoint $SPDT_i$, where the subscript $i$ refers to a given refiner;

separate means for measuring the rise in temperature $DT_i$ of stock being put through each of said refiners, where the subscript $i$ refers to said given refiner, and for transmitting to said computational means a signal representing the temperature-rise measurement $DT_i$;

means for entering into said computational means laboratory freeness measurements made of the stock output of individual refiners, said computational means calculating an average freeness of the individual laboratory freeness measurement and the difference between said calculated average and the freeness of each refiner $i$ to develop a signal $SPDTB_i$ representing the difference, said computational means further computing the algebraic sum of said predetermined setpoint $SPDT_i$ and said difference $SPDTB_i$ whereby a new setpoint is provided for transmittal to said control means for so controlling said adjustable element thereof as to maintain the rise in temperature of stock being put therethrough at a level which brings the freeness of stock from refiner $i$ in line with said average freeness.

39. Apparatus as defined in claim 38 including individual means for measuring a variable proportional to rate of stock flow through each refiner and transmitting to said computational means a signal proportional thereto, and wherein said computational means computes said average freeness as a weighted average, the weighting factor employed for each refiner being said proportional signal.

40. Apparatus as defined in claim 39 wherein said variable proportional to rate of stock flow through a given refiner $i$ is power $KW_i$ being consumed thereby, and wherein said computational means computes said weighting factor for said given refiner $i$ as the ratio of power $KW_i$ to the rise in temperature $DT_i$.

41. Apparatus as defined in claim 40 wherein said computational means calculates predicted power consumption of said given refiner $i$ which would result from its setpoint $SPDT_i$ being altered by said difference $SPDTB_i$, compares said predicted power with a predetermined maximum power loading for said refiner, and allows said control means to control said adjustable element to said setpoint $SPDT_i$ altered by said difference $SPDTB_i$ if said predicted power does not exceed said maximum power and allows said control means to control said adjustable element to load said refiner only to its maximum power if said predicted power does exceed said maximum power.

42. Apparatus as defined in claim 41 wherein said computational means signals for a reduction in stock flow rate to said given refiner $i$ if said predicted power does exceed said maximum power.

43. Apparatus for controlling a plurality of parallel refiners in a paper mill to maintain freeness of stock to a headbox constant, each of said refiners having an adjustable element responsive to a positioning signal $SPDT_i$ for varying work done therein on said stock, whereby freeness is controlled as a function of temperature-rise $DT_i$ of stock being put through individual ones of said refiners, where the subscript $i$ represents a given refiner, and said positioning signal $SPDT_i$ is, from time to time, to be altered by having another signal $SPDTB_i$ algebraically added thereto, said apparatus comprising:

computational means for receiving signals representing said positional signal $SPDT_i$ and said input signal $SPDTB_i$ and in response thereto calculating predicted power consumption of said given refiner $i$ which would result from its positioning signal $SPDT_i$ being altered by said input signal $SPDTB_i$ and summing the predicted power thus computed of all refiners;

means for entering into said computational means the predetermined maximum power loading of each of said refiners, said computational means computing the ratio of the sum of the predicted power of all refiners to the sum of the maximum power loading of all refiners; and means for entering into said computational means a predetermined fractional power lower limit, said computational means comparing the value of said ratio with said predetermined fractional power lower limit and in response thereto indicating a refiner should be removed when said fractional power is less than said lower limit.

44. Apparatus as defined in claim 43 including means for entering into said computational means a predetermined fractional power upper limit, said computational means comparing the value of said ratio with the value of said predetermined fractional power upper limit and in response thereto indicating a refiner should be added when the value of said ratio is greater than said upper limit.

45. Apparatus for controlling refiner operation in a paper mill to maintain freeness of stock to a headbox constant, said refiner having an adjustable element responsive to a positioning signal for varying work done therein on said stock, whereby freeness is controlled as a function of work done by controlling said adjustable element, said apparatus comprising:

computational means for receiving signals representing variables measured by sensors and in response thereto carrying out computational steps resulting in a control signal;

means for measuring the rise in temperature and the consistency of stock being put through said refiner, and transmitting to said computational means signals representing each of said measurements, said computational means computing a control signal for so controlling said adjustable element as to vary the rise in temperature of stock being put through said refiner to maintain the ratio of temperature rise to consistency substantially constant; and control means connected to said computational means for receiving said control signal and in response thereto positioning said adjustable element.

46. Apparatus as defined by claim 45 wherein said control signal is computed as a function of a present control signal SPDT, a previous consistency measurement $CON_1$ and a present consistency measurement $CON_2$ in accordance with the following equation:

$$[SPDT] = SPDT \times CON_1/CON_2$$

47. Apparatus as defined by claim 46 including means for entering into said computational means a predetermined maximum power KWMAX for said refiner, said computational means predicting the power to be consumed by said refiner after said adjustable element is positioned by said control signal and comparing the predicted power with the predetermined maximum power to calculate an alternate control signal if said predicted power exceeds said maximum power to so position said adjustable element in response to the alternate control signal as to load said refiner to just said maximum power.

48. Apparatus as defined in claim 45 wherein a plurality of refiners are connected in parallel to furnish stock to said headbox, and wherein said computational means computes control signals for the adjustable element for each of said refiners in sequence, each to so vary the temperature of stock being put through it as to maintain the ratio of temperature rise to consistency of stock furnished to all refiners substantially constant.

49. Apparatus as defined by claim 48 wherein said computational means is adapted to alter the computed control signal of each refiner by a separately specified amount in proportion to a previous consistency measurement and a present consistency measurement of stock being put through each respective refiner.

50. Apparatus as defined by claim 48 including: means for entering into said computational means individual freeness measurements made of stock output from all refiners, said computational means calculating an average freeness from the individual freeness measurements thrus entered; and where said control signal is altered by an amount calculated by said computational means for a given refiner i as a function of the difference between said average freeness and the individual freeness measurement entered into said computational means for said given refiner i.

51. Apparatus as defined by claim 49 including:

means for measuring the freeness of composite stock furnished to said headbox from said plurality of refiners in parallel, and transmitting to said computational means a signal representative of the measured composite freeness, said computational means calculating the difference between said measured composite freeness and a predetermined freeness; and wherein said calculating means computes the amount by which said control signal is to be altered for a given refiner as a function of the difference between said measured composite freeness and said predetermined freeness.

* * * * *